(12) United States Patent
Preciado et al.

(10) Patent No.: US 10,510,092 B2
(45) Date of Patent: Dec. 17, 2019

(54) SYSTEM AND METHOD OF MATRIX BASED ORGANIZATION OF COMMODITY OFFERS

(75) Inventors: David Preciado, Miami, FL (US); Daniel Loredo, Surfside, FL (US)

(73) Assignee: LATINCARZ, LLC, Miami, FL (US)

( * ) Notice: Subject to any disclaimer, the term of this patent is extended or adjusted under 35 U.S.C. 154(b) by 1938 days.

(21) Appl. No.: 13/590,588

(22) Filed: Aug. 21, 2012

(65) Prior Publication Data
US 2014/0058824 A1 Feb. 27, 2014

(51) Int. Cl.
G06Q 30/02 (2012.01)
G06Q 30/00 (2012.01)

(52) U.S. Cl.
CPC .............................. G06Q 30/0243 (2013.01)

(58) Field of Classification Search
None
See application file for complete search history.

(56) References Cited

U.S. PATENT DOCUMENTS

2003/0125994 A1* 7/2003 Jaehn ..................... G06Q 10/02
705/5
2012/0042277 A1* 2/2012 Lin-Hendel ........... G06F 3/0482
715/784

OTHER PUBLICATIONS

Shapiro, Dmitry et al. Market Segmentation: The Role of Opaque Travel Agencies. Nov. 15, 2006. Available at: file:///C:/Users/kkolosowski/Downloads/Shapiro367.pdf (Year: 2006).*
Expedia—"Screen capture from Expedia," available at www.expedia.com (last accessed Jun. 2013).
Travelocity—"Screen capture from Travelocity", availalbe at www.travelocity.com (last accessed Jun. 2013).

* cited by examiner

*Primary Examiner* — Katherine Kolosowski-Gager
(74) *Attorney, Agent, or Firm* — Lando & Anastasi, LLP

(57) ABSTRACT

Provided in various aspects, are systems and methods for organizing and delivering commodity information to a consumer in an easily understood user interface. In some embodiments, the user interface is specially configured to present a matrix of information to the consumer, blending "branded" and non-branded opportunities. Branded opportunities can be configured to present commodity information in association with a specific provider or the provider's brand. Combining branded opportunities with unbranded opportunities enables commodity providers to target brand loyal customers while at the same time providing discounted opportunities without diluting brand associations. The matrix based organization can be implemented in conjunction with commodity data feed providers, including for example, rental car information suppliers to deliver commodity information in an easily understood user interface. Matrix displays can organize branded and non-branded offers while at the same time minimizing the data over-load such a volume of offers conventionally presents.

17 Claims, 14 Drawing Sheets

| | Our Pick | AVIS | National | Thrifty | Hertz | Budget | Alamo |
|---|---|---|---|---|---|---|---|
| Economy 204A | Best Deal $32 USD Carro 13 [Book Now] ⊞ Description | $41 USD Toyota Yaris [Book Now] ⊞ Description | $43 USD Toyota Yaris-N [Book Now] ⊞ Description | $44 USD Toyota Yaris-T [Book Now] ⊞ Description | $45 USD Carro1-bog [Book Now] ⊞ Description | $46 USD Mercedes-Benz [Book Now] ⊞ Description | $47 USD Carro Alamo [Book Now] ⊞ Description |
| Compact 204B | Best Deal $49 USD Carro 10 [Book Now] ⊞ Description | Hertz $50 USD Carro 2 [Book Now] ⊞ Description | National $55 USD Carro-N [Book Now] ⊞ Description | Budget $57 USD Hundai Elantra [Book Now] ⊞ Description | Thrifty $60 USD Carro-CT [Book Now] ⊞ Description | Alamo $61 USD Carro-CA [Book Now] ⊞ Description | AVIS $65 USD Carro 4 [Book Now] ⊞ Description |
| Intermediate 204C | Best Deal $60 USD Carro miami [Book Now] ⊞ Description | Budget $65 USD Carro-IB [Book Now] ⊞ Description | Alamo $66 USD Carro-IA [Book Now] ⊞ Description | Thrifty $69 USD Toyota Camry [Book Now] ⊞ Description | Avis $75 USD Carro 6 [Book Now] ⊞ Description | Hertz $76 USD Carro 5 [Book Now] ⊞ Description | National $78 USD Carro IN [Book Now] ⊞ Description |
| Standard 204D | Best Deal $72 USD Ford [Book Now] ⊞ Description | Thrifty $77 USD Carro-ST [Book Now] ⊞ Description | Hertz $79 USD Carro 7 [Book Now] ⊞ Description | AVIS $80 USD Carro 8 [Book Now] ⊞ Description | Budget $81 USD Carro-S8 [Book Now] ⊞ Description | National $82 USD Carro-SN [Book Now] ⊞ Description | Alamo $83 USD Carro-SAI [Book Now] ⊞ Description |
| Fullsize 204E | Best Deal $74 USD Ford Taurus [Book Now] ⊞ Description | National $79 USD Chrysler 300 [Book Now] ⊞ Description | Alamo $80 USD Carro-FAI [Book Now] ⊞ Description | AVIS $83 USD Carro 9 [Book Now] ⊞ Description | Hertz $84 USD Golf [Book Now] ⊞ Description | Thrifty $85 USD Carro-FT [Book Now] ⊞ Description | Budget $86 USD Carro-FB [Book Now] ⊞ Description |

FIG. 2

| | 206A | 206B | 206C | 206D | 206E | 206F | 206G |
|---|---|---|---|---|---|---|---|
| Economy 204A | Our Pick☑<br>Best Deal<br>$32 USD<br>Carro 13<br>[Book Now]<br>⊞Description *210* | AVIS<br>$41 USD<br>Toyota Yaris<br>[Book Now]<br>⊞Description | National<br>$43 USD<br>Toyota Yaris-N<br>[Book Now]<br>⊞Description | Thrifty<br>$44 USD<br>Toyota Yaris-T<br>[Book Now]<br>⊞Description | Hertz<br>$45 USD<br>Carro1-bog<br>[Book Now]<br>⊞Description | Budget<br>$46 USD<br>Mercedes-Benz<br>[Book Now]<br>⊞Description | Alamo *202*<br>$47 USD<br>Carro Alamo<br>[Book Now] *208*<br>⊞Description |
| Compact 204B | Best Deal<br>$49 USD<br>Carro 10<br>[Book Now]<br>⊞Description | Hertz<br>$50 USD<br>Carro 2<br>[Book Now]<br>⊞Description | National<br>$55 USD<br>Carro-N<br>[Book Now]<br>⊞Description | Budget<br>$57 USD<br>Hundai Elantra<br>[Book Now]<br>⊞Description | Thrifty<br>$60 USD<br>Carro-CT<br>[Book Now]<br>⊞Description | Alamo<br>$61 USD<br>Carro-CA<br>[Book Now]<br>⊞Description | AVIS<br>$65 USD<br>Carro 4<br>[Book Now]<br>⊞Description |
| Intermediate 204C | Best Deal<br>$60 USD<br>Carro miami<br>[Book Now]<br>⊞Description | Budget<br>$65 USD<br>Carro-IB<br>[Book Now]<br>⊞Description | Alamo<br>$66 USD<br>Carro-IA<br>[Book Now]<br>⊞Description | Thrifty<br>$69 USD<br>Toyota Camry<br>[Book Now]<br>⊞Description | Avis<br>$75 USD<br>Carro 6<br>[Book Now]<br>⊞Description | Hertz<br>$76 USD<br>Carro 5<br>[Book Now]<br>⊞Description | National<br>$78 USD<br>Carro IN<br>[Book Now]<br>⊞Description |
| Standard 204D | Best Deal<br>$72 USD<br>Ford<br>[Book Now]<br>⊞Description | Thrifty<br>$77 USD<br>Carro-ST<br>[Book Now]<br>⊞Description | Hertz<br>$79 USD<br>Carro 7<br>[Book Now]<br>⊞Description | AVIS<br>$80 USD<br>Carro 8<br>[Book Now]<br>⊞Description | Budget<br>$81 USD<br>Carro-S8<br>[Book Now]<br>⊞Description | National<br>$82 USD<br>Carro-SN<br>[Book Now]<br>⊞Description | Alamo<br>$83 USD<br>Carro-SAl<br>[Book Now]<br>⊞Description |
| Fullsize 204E | Best Deal<br>$74 USD<br>Ford Taurus<br>[Book Now]<br>⊞Description | National<br>$79 USD<br>Chrysler 300<br>[Book Now]<br>⊞Description | Alamo<br>$80 USD<br>Carro-FAl<br>[Book Now]<br>⊞Description | AVIS<br>$83 USD<br>Carro 9<br>[Book Now]<br>⊞Description | Hertz<br>$84 USD<br>Golf<br>[Book Now]<br>⊞Description | Thrifty<br>$85 USD<br>Carro-FT<br>[Book Now]<br>⊞Description | Budget<br>$86 USD<br>Carro-FB<br>[Book Now]<br>⊞Description |

⟨Destination⟩⟨Select a Car⟩⟨Coverages⟩⟨Check Out⟩

*200*

Lowest Price Search

Rental Location*

Rental Location*

Pick-up Date* Time* [Select]

Drop-off Date* Time* [Select]

Choose Rate (●) Just Car — 902
( ) Car & Coverages — 904
( ) All Inclusive — 906

Basic rate and unlimited miles, excludes applicable local taxes — 908

[Search]

*FIG. 9A*

( ) Just Car   (●) Car & Coverages — 904   ( ) All Inclusive

Unlimited miles, LDW/CDW Coverage, excludes applicable local taxes — 908

[Search]

*FIG. 9B*

( ) Just Car   ( ) Car & Coverages   (●) All Inclusive — 906

Unlimited miles, LDW/CDW Coverage, Liability Insurance and applicable local taxes — 908

[Search]

*FIG. 9C*

LOWEST PRICE SEARCH

Rental Location*

Rental Location*

Pick-up Date*  Time*  Drop-off Date*  Time*
[Select ▼]  [Select ▼]

CHOOSE RATE

○ Just Car   ○ Car & Protection   ● Inclusive — 1002

Liability insurance, CDW/LDW protection, additional driver, unlimited mileage*, and mandatory taxes and fees — 1004

[Search]

HOME    ABOUT    NEWS    CONTACT

You Chose                Company *Hertz*

Car Name or Similar      Pick up
                           Location: MIA
                           Date: 08-20-2012 Time: 9
                         Drop off
                           Location: MIA
                           Date: 08-27-2012 Time: 9
                         Total Rental Days Features English/Spanish Choose your best rate

| Options | Description | Pay Now | Pay Later |
|---|---|---|---|
| Just Car | Basic Rate with unlimited mileage* and mandatory taxes and fees | ○ USD $235.63 | ○ USD $235.63 |
| Car & Protection | CDW/LDW protection, unlimited mileage*, and mandatory taxes and fees | ○ USD $247.56 | ○ USD $247.56 |
| Inclusive | Liability Insurance, CDW/LDW protection, additional driver, unlimited mileage* and mandatory taxes and fees | ○ USD $233.00 | ○ USD $233.00 |
| All Inclusive | First tank of gas, unlimited mileage, CDW/LDW protection, liability insurance, additional driver, and mandatory taxes and fees | ○ USD $288.00 | ○ USD $288.00 |

FIG. 12

| | 1320 | 1350 | 1352 | 1354 | 1356 | 1358 | 1360 | 1362 | 1364 |
|---|---|---|---|---|---|---|---|---|---|
| Economy 1302 | 1301 1322 1324 | Best Deal USD 194.78 CarName or Similar ECAR [Book Now] [+ Description] | Hertz USD 228.50 CarName or Similar ECAR [Book Now] [+ Description] | National USD 273.97 CarName or Similar ECAR [Book Now] [+ Description] | AVIS USD 285.54 CarName or Similar ECAR [Book Now] [+ Description] | Alamo USD 309.88 CarName or Similar ECAR [Book Now] [+ Description] | Thrifty USD 651.43 Chevrolet Aveo ECAR [Book Now] [+ Description] | AVIS USD 285.54 CarName or Similar EDAR [Book Now] [+ Description] | Thrifty USD 651.43 Chevrolet Aveo EDAR [Book Now] [+ Description] |
| Compact 1304 | 1328 | Best Deal USD 204.19 CarName or Similar CCAR [Book Now] [+ Description] | Hertz USD 235.63 CarName or Similar CCAR [Book Now] [+ Description] | National USD 285.72 CarName or Similar CCAR [Book Now] [+ Description] | AVIS USD 293.77 CarName or Similar CCAR [Book Now] [+ Description] | Alamo USD 330.83 CarName or Similar CCAR [Book Now] [+ Description] | Thrifty USD 651.43 Ford Focus CCAR [Book Now] [+ Description] | Thrifty USD 651.43 Ford Focus CDAR [Book Now] [+ Description] | |
| Midsize 1306 | | Best Deal USD 298.26 CarName or Similar ICAR [Book Now] [+ Description] | National USD 309.24 CarName or Similar ICAR [Book Now] [+ Description] | AVIS USD 239.71 CarName or Similar ICAR [Book Now] [+ Description] | Alamo USD 362.73 CarName or Similar ICAR [Book Now] [+ Description] | Thrifty USD 658.93 Dodge Avenger ICAR [Book Now] [+ Description] | | | |
| Standard 1308 | | Best Deal USD 307.67 CarName or Similar SCAR [Book Now] [+ Description] | Hertz USD 311.94 CarName or Similar SCAR [Book Now] [+ Description] | National USD 321.00 CarName or Similar SCAR [Book Now] [+ Description] | AVIS USD 352.35 CarName or Similar SCAR [Book Now] [+ Description] | Alamo USD 393.98 CarName or Similar SCAR [Book Now] [+ Description] | Thrifty USD 667.56 Ford Fusion SCAR [Book Now] [+ Description] | Thrifty USD 667.56 Ford Fusion SDAR [Book Now] [+ Description] | Alamo USD 1550.92 CarName or Similar SRAR [Book Now] [+ Description] |

HOME    ABOUT    NEWS    CONTACT

SYSTEM AND METHOD OF MATRIX BASED ORGANIZATION OF COMMODITY OFFERS

BACKGROUND

As the availability and volume of internet services and products grows exponentially, the ability of consumers to appreciate and take advantage of the best deals can be overwhelmed by the sheer volume of information the consumer needs to process. This can be particularly true in the context of rental services. For example, online car rentals have been increasing in volume and frequency. The number of providers has likewise expanded to the point that an ordinary consumer cannot readily appreciate the volume of information being delivered in response to a simple search for the lowest price car. Further, the providers encounter great difficulty in delivering the volume of available car inventories under such conditions.

Various conventional approaches have attempted to resolve some of these issues, for example, by establishing broker systems that operate as front ends to suppliers. Oftentimes these broker systems provide access to "distressed" inventory achieving significant price savings. However, customers can be required to complete bookings for services prior to knowing who the actual provider is. Further complicating consumer access and inventory deliveries are the business concerns of the brokers, who naturally gravitate towards suppliers offering the best commission. Online travel agencies also attempt to deliver inventory to consumers while providing information on brand and price. However, conventional organization by provider and/or car group and brand can be cumbersome and can fail to deliver important information.

Other conventional systems, including Global Distribution Systems (GDSes) deliver consumer information (e.g., pricing, brand, availability, etc.) in a pre-packaged format. Pre-packaged formats typically result in organizational issues and further can fail to provide consumer tailorable offers and/or information.

SUMMARY

Accordingly, provided in various aspects, are systems and methods for organizing and delivering commodity information to a consumer in an easily understood user interface. In some embodiments, the user interface is specially configured to present a matrix of information to the consumer, blending "branded" and non-branded opportunities. Branded opportunities can be configured to present commodity information in association with a specific provider or the provider's brand. Oftentimes consumers display brand loyalty, which can be based on perceptions of quality, reliability, and/or other criteria including intangible criteria that a specific consumer or consumer segment associates with a specific brand. Combining branded opportunities with unbranded opportunities enables commodity providers to target brand loyal customers while at the same time providing discounted opportunities without diluting brand associations. Presenting these opportunities in a display matrix that organizes commodity offers based on price irrespective of the provider/brand enables quick and easy appreciation of available offers. Further organization into rows organized on price based on commodity groups can also facilitate review of a multitude of commodity offers. In addition, some embodiments include commodity offers without brand affiliation into a display matrix. Unbranded offers enable commodity providers to offer deeply discounted rates without revealing the brand provider until a prepaid purchase/reservation is confirmed.

Various industries include commodity data feed providers, who deliver services in the form of providing a data feed that is the aggregation commodity data from a plurality of market participants. One particular example includes the auto rental industry. A number of aggregation providers supply data feeds, which represent an aggregation of a plurality of rental companies inventory and offers, including, for example, timing, location, commission, etc. According to one aspect, systems and methods for delivering such feed data to consumers in an easily understood format is provided. According to one embodiment, both branded and non-branded displays can be presented to consumers in a matrix display. The matrix display can organize both branded and non-branded offers over a plurality of providers while at the same time minimizing the data over-load such a volume of offers conventionally presents.

In other aspects, other industries that provide large volumes of commodity offers to consumers can benefit significantly from matrix based organization and presentation of branded and non-branded opportunities. Other example industries include hotel and airfare suppliers.

According to one aspect, a computer implement method for generating a user interface for remote display of rental information is provided. The method comprises receiving, over a communication network, rental data from a plurality of commodity providers, identifying, by the computer system, branded rental offers and non-branded rental offers; accessing, by the computer system, a leading non-branded offer from the non-branded rental offers; generating, by the computer system, branded display elements and non-branded display elements, organizing, by the computer system, the branded and non-branded display elements into a matrix of display elements.

According to one embodiment, the method further comprises an act of limiting non-branded display elements within the matrix display. According to one embodiment, the act of limiting non-branded display elements includes an act of limiting the non-branded display elements to one non-branded display element per commodity grouping. According to one embodiment, the method further comprises an act of accepting bids to establish a leading non-branded offer. According to one embodiment, the method further comprises organizing, by the computer system, the branded and non-branded display elements into a matrix of display elements includes an act of organizing the display elements into a plurality of commodity groups.

According to one embodiment, the act of organizing includes an act of displaying the display elements in rows based on the plurality of commodity groups. According to one embodiment, the act of organizing includes an act of sorting the plurality of display elements within each of the plurality of commodity groups based on associated pricing information. According to one embodiment, the act of organizing includes an act of displaying at most one non-branded display element and a plurality of branded display elements in each one of the plurality of commodity groups. According to one embodiment, the method further comprises an act of analyzing automatically received bids to establish the leading non-branded offer.

According to one embodiment, the act of accessing the leading non-branded offer includes an act of determining a received bid includes better terms than an existing leading non-branded offer. According to one embodiment, the received bids are required to improve at least one term of the existing leading non-branded offer. According to one embodiment, the at least one term includes a commission rate associated with a rental offer.

According to one aspect a user interface rendered on a display of the computer system in response to execution of instructions on at least one processor of the computer system is provided. The user interface comprises a plurality of branded display elements, at least one non-branded display element, wherein each of the branded and non-branded display elements include a first and second action element responsive to selection in the user interface, wherein the first action element is configured to transition the computer system to a rental purchase screen responsive to selection in the user interface, and wherein the second action element is configured to transition a respective display element from a non-expanded view of the respective display element to an expanded view of the respective display element, a matrix display for displaying the plurality of branded and the at least one non branded display element, wherein the matrix display is further configured to organize the plurality of branded and the at least one non branded display element into a plurality of commodity groups, wherein each commodity group is displayed as a row within the matrix display.

According to one embodiment, the matrix display is further configured to include up to one non-branded display element in each of the plurality of commodity groups. According to one embodiment, the matrix display organizes the at least one non-branded display element and the plurality of branded display elements into rows of the matrix display for each one of the plurality of commodity groups. According to one embodiment, the matrix display is further configured to organize the at least one non-branded display elements and the plurality of branded display elements into rows based on the plurality of commodity groups and positions sorted on price. According to one embodiment, selection of the second action element in any of the display elements of the matrix display reconfigures the display elements appearing in the associated row and associated position of display elements to a size corresponding to the expanded view of the respective display element in which the second action element is selected.

According to one aspect, a system for generating a matrix display in a user interface is provided. The system comprises at least one processor operative connected to a memory, wherein the processor is configured to execute a plurality of system components, wherein the plurality of system components comprises a communication component configured to receive rental data from a plurality of rental providers, an analysis component configured to identify branded rental offers and non-branded rental offers, wherein the analysis component is further configured to determine a leading non-branded offer from the non-branded rental offers, a display component configured to generate branded display elements and non-branded display elements, wherein the display component is further configured to organize the branded and non-branded display elements into a matrix of display elements.

According to one embodiment, the display component is further configured to limit non-branded display elements within the matrix display. According to one embodiment, the act of limiting non-branded display elements includes an act of limiting the non-branded display elements to one non-branded display element per commodity grouping. According to one embodiment, the system further comprises a bid component configured to accept bids to establish a leading non-branded offer. According to one embodiment, the display component is further configured to organizing the display elements into a plurality of commodity groups.

According to one embodiment, the display component is further configured to display the display elements in rows based on the plurality of commodity groups. According to one embodiment, the display component is further configured to sort the plurality of display elements within each of the plurality of commodity groups based on associated pricing information. According to one embodiment, the display component is further configured to display at most one non-branded display element and a plurality of branded display elements in each one of the plurality of commodity groups.

According to one embodiment, the bid component is further configured to analyze the received bids to establish the leading non-branded offer. According to one embodiment, the bid component is further configured to determine a received bid includes better terms than an existing leading non-branded offer. According to one embodiment, the bid component is further configured to require the received bids improve at least one term of the existing leading non-branded offer. According to one embodiment, the at least one term includes a commission rate associated with a rental offer.

According to one aspect, a computer implement method for generating a user interface for remote display of commodity information is provided. The method comprises receiving, over a communication network, commodity data from a plurality of commodity providers, identifying, by the computer system, branded commodity offers and non-branded commodity offers, accessing, by the computer system, a leading non-branded offer from the non-branded commodity offers, generating, by the computer system, branded display elements and non-branded display elements; organizing, by the computer system, the branded and non-branded display elements into a matrix of display elements.

According to one embodiment the method further comprises an act of limiting non-branded display elements within the matrix display. According to one embodiment, the act of limiting non-branded display elements includes an act of limiting the non-branded display elements to one non-branded display element per commodity grouping. According to one embodiment the method further comprises an act of accepting bids to establish a leading non-branded offer.

According to one embodiment, organizing, by the computer system, the branded and non-branded display elements into a matrix of display elements includes an act of organizing the display elements into a plurality of commodity groups. According to one embodiment, the act of organizing includes an act of displaying the display elements in rows based on the plurality of commodity groups. According to one embodiment, the act of organizing includes an act of sorting the plurality of display elements within each of the plurality of commodity groups based on associated pricing information. According to one embodiment, the act of organizing includes an act of displaying at most one non-branded display element and a plurality of branded display elements in each one of the plurality of commodity groups.

According to one embodiment, the method further comprises an act of analyzing automatically received bids to establish the leading non-branded offer. According to one embodiment, the act of accessing the leading non-branded offer includes an act of determining a received bid includes better terms than an existing leading non-branded offer. According to one embodiment, the received bids are required to improve at least one term of the existing leading non-branded offer. According to one embodiment, the at least one term includes a commission rate associated with a commodity offer.

According to one aspect, a user interface displayed on a computer system, wherein the user interface is rendered on a display of the computer system in response to execution of instructions on at least one processor of the computer system is provided. The user interface comprises a plurality of branded display elements, at least one non-branded display element, wherein each of the branded and non-branded display elements include a first and second action element responsive to selection in the user interface, wherein the first action element is configured to transition the computer system to a commodity purchase screen responsive to selection in the user interface, and wherein the second action element is configured to transition a respective display element from a non-expanded view of the respective display element to an expanded view of the respective display element, a matrix display for displaying the plurality of branded and the at least one non branded display element, wherein the matrix display is further configured to organize the plurality of branded and the at least one non branded display element into a plurality of commodity groups, wherein each commodity group is displayed as a row within the matrix display.

According to one embodiment, the matrix display is further configured to include up to one non-branded display element in each of the plurality of commodity groups. According to one embodiment, the matrix display organizes the at least one non-branded display element and the plurality of branded display elements into rows of the matrix display for each one of the plurality of commodity groups. According to one embodiment, the matrix display is further configured to organize the at least one non-branded display elements and the plurality of branded display elements into rows based on the plurality of commodity groups and positions sorted on price. According to one embodiment, selection of the second action element in any of the display elements of the matrix display reconfigures the display elements appearing in the associated row and associated position of display elements to a size corresponding to the expanded view of the respective display element in which the second action element is selected.

According to one aspect, a system for generating a matrix display in a user interface is provided. The system comprising at least one processor operatively connected to a memory, wherein the processor is configured to execute a plurality of system components, wherein the plurality of system components comprise a communication component configured to receive commodity data from a plurality of commodity providers; an analysis component configured to identify branded commodity offers and non-branded commodity offers, wherein the analysis component is further configured to determine a leading non-branded offer from the non-branded commodity offers; a display component configured to generate branded display elements and non-branded display elements, wherein the display component is further configured to organize the branded and non-branded display elements into a matrix of display elements.

According to one embodiment, the display component is further configured to limit non-branded display elements within the matrix display. According to one embodiment, the act of limiting non-branded display elements includes an act of limiting the non-branded display elements to one non-branded display element per commodity grouping. According to one embodiment, the method further comprises a bid component configured to accept bids to establish a leading non-branded offer. According to one embodiment, the display component is further configured to organizing the display elements into a plurality of commodity groups.

According to one embodiment, the display component is further configured to display the display elements in rows based on the plurality of commodity groups. According to one embodiment, the display component is further configured to sort the plurality of display elements within each of the plurality of commodity groups based on associated pricing information. According to one embodiment, the display component is further configured to display at most one non-branded display element and a plurality of branded display elements in each one of the plurality of commodity groups.

According to one embodiment, the bid component is further configured to analyze the received bids to establish the leading non-branded offer. According to one embodiment, the bid component is further configured to determine a received bid includes better terms than an existing leading non-branded offer. According to one embodiment, the bid component is further configured to require the received bids improve at least one term of the existing leading non-branded offer. According to one embodiment, the at least one term includes a commission rate associated with a commodity offer.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

FIG. 2 is an example user interface for organizing branded and white list offers, according to one embodiment;

FIGS. 9A-C illustrate an example user interface display, according to one embodiment;

FIG. 10 is an example user interface display, according to one embodiment;

FIG. 11 is an example user interface display, according to one embodiment;

FIG. 12 is an example user interface display, according to one embodiment;

FIG. 13 is an example user interface for organizing branded and white list offers, according to one embodiment; and FIG. 14 is an example user interface for organizing branded and white list offers, according to one embodiment.

DETAILED DESCRIPTION

Stated broadly, various aspects herein are directed to methods and systems for generating a matrix display of commodity offers to an end user. According to one embodiment, provided is a matrix engine executing on a computer system for generating the matrix display from a source of commodity offer information.

Figure 1:
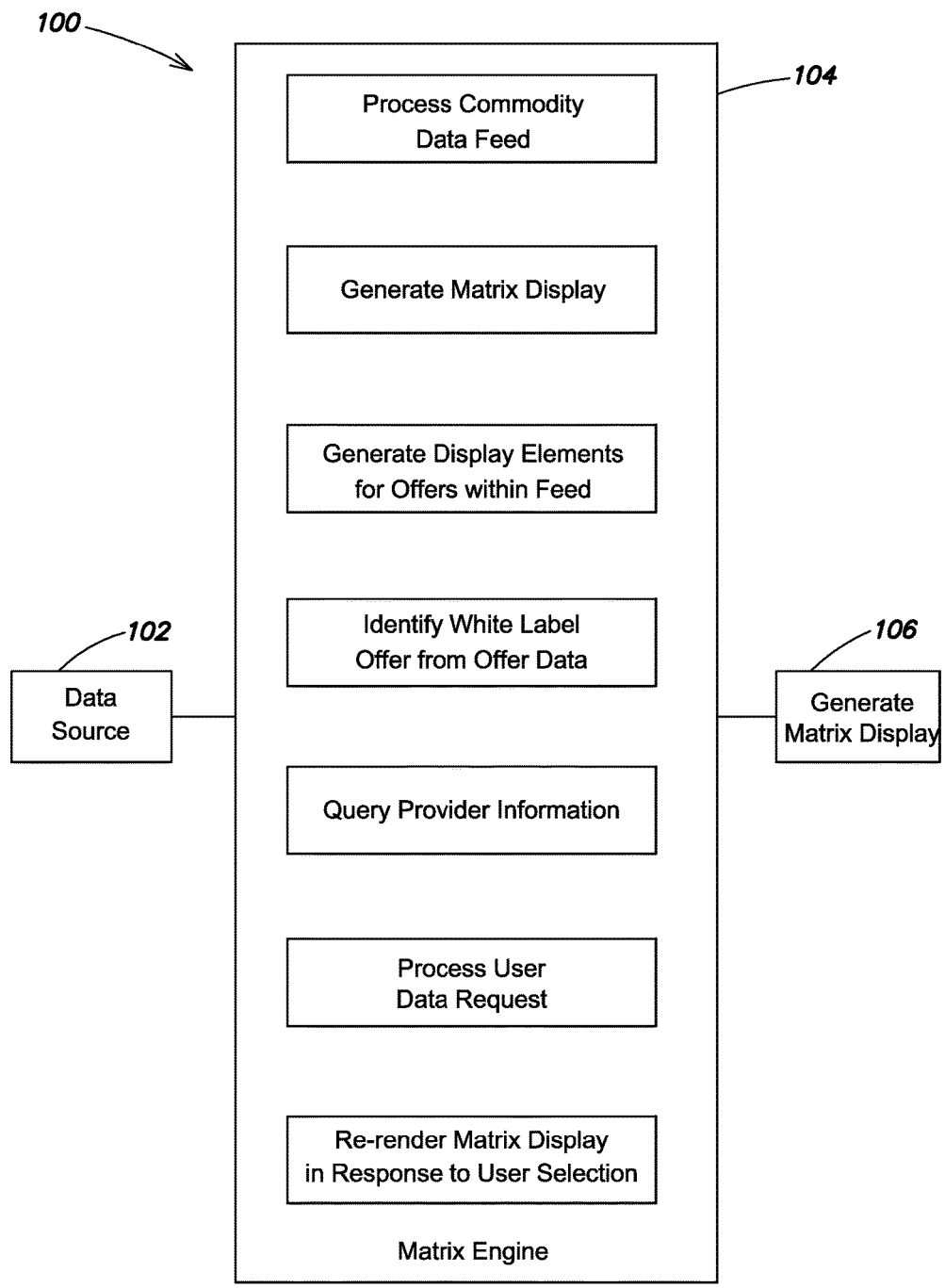
FIG. 1 is an example block diagram of a matrix engine, according to one embodiment.

In some embodiments, a display matrix can be automatically generated by a matrix engine based upon search criteria entered by a user. Shown in FIG. 1 is a block diagram of an example matrix system 100. The matrix system 100 can include a matrix engine 104 executing on one or more computer systems. The one or more computer systems can include computer system 700, FIG. 7, discussed in greater detail below. In some embodiments, the matrix engine can be configured to generate the display matrix responsive to queries submitted by users. The matrix engine can also be configured to generate matrix displays (e.g. 106) based on information about users communicating with the matrix system 100.

In some embodiments, the matrix engine can be executed on a computer system operatively connected to a communication network (e.g., the Internet). The matrix engine can be configured to receive commodity data from a data service provider. In some examples, the data provider captures commodity information (e.g., sales, offer price, location, commodity detail, offer criteria, rental price, rental period, etc.) from a plurality of commodity providers and delivers the information as a data feed to subscribers. In some embodiments, the matrix engine can be configured to process such data feeds (e.g., 102) to generate matrix displays (e.g., 106) of commodity offers. In some implementations, a consumer interacts with a user interface displayed on a web site. The consumer can input specific criteria for a desired commodity (e.g., a rental car) into the user interface and the matrix engine can process feed data to deliver matching offers to the consumer.

According to some embodiments, the matrix engine is specially configured to generate user interface displays that combine branded offers from a plurality of providers and non-branded offers into minimalistic renderings organized irrespective of the specific brands associated with the offers. The minimalistic renderings are specifically configured to convey commodity offers in a manner that provides consistent interface elements for all commodity offers, while permitting a consumer to readily focus on the information most relevant for delivering the offer, including for example, price. The matrix engine can also be configured to assemble branded interface elements having offers associated with specific provider brands with non-branded interface elements displaying pricing and commodity information while concealing any brand affiliation. Each display element can be associated with a respective commodity offer, and the plurality offer display elements can be organized into a display matrix rendered in a user interface.

According to one embodiment, the display matrix can include branded display elements and "white list" or non-branded display elements. In some embodiments, the matrix engine is configured to generate a display matrix having consistent branded interface elements, which can include, for example, a brand specification, a listing price, item title, item description element, and an action element. The interface elements rendered within the display matrix can be configured to be responsive to selection in the user interface. In some examples, a description element can be configured to provide additional detail on a commodity offer, which can include comparison information as well. According to one embodiment, the matrix engine can be configured to render additional detail associated with the commodity offer within the display matrix responsive to selection of a description element.

In one example, the matrix engine can generate a matrix display that expands a selected display element within the matrix display. A branded display element, for example, can be expanded within the matrix display to include any additional commodity detail (e.g., picture of the commodity, further specification of the commodity, comparison information, etc). In some examples, a picture of the actual commodity (e.g., rental car) being offered is displayed responsive to selection of the description element. The matrix engine can likewise expand display elements that are grouped within a selected category to maintain consistency between the expanded display element and neighboring display elements within a display matrix.

In addition to generating and displaying branded elements, the matrix engine can be configured to incorporate white list display elements. The matrix engine can be configured to generate white list display elements to have a consistent visual appearance relative to branded display elements. In one embodiment, the matrix engine generates white list display elements, which can include a white list title (e.g., "best deal" having no brand association), pricing information, an action element, and a description element. For example, one visible difference between branded and white list offers can include inclusion or lack of a brand affiliation in a respective display element of the matrix display. The white list title can be configured to display a generic brand, for example, associated with a re-seller's web-site. In other embodiments, the white list title can include "Best Price," "Best Deal," etc.

The matrix engine can be further configured to generate a grid based layout for a display matrix that incorporates both branded and white list display elements. Shown in FIG. 2 is an example user interface 200 displaying an embodiment of a display matrix 202 generated by a matrix system (e.g., 100, FIG. 1). The display matrix 202 can be organized based on a grid layout having rows 204A-E associated with groupings of any offers displayed in the display matrix 202. Each position with reach row of the grid (e.g., positions 206A-G in row 204A) can include display elements that provide consistent and easily appreciated offers. As discussed, the display elements generated by the matrix engine can include branded display elements (e.g., as shown in row 204A at positions 206B-G) and white list or non-branded display elements (e.g., as shown in row 204A at position 206A).

The matrix engine can be configured to sort display elements based on pricing, irrespective of the brand associated with a particular offer. In the illustrated example, a matrix engine is configured to accept and process a data feed from a vehicle rental data source. Within the data, rental cars can be grouped by class, size, model, etc. In some embodiments, the matrix engine can use such groupings of the commodity data as part of a display matrix. As shown at 206B-206G in the economy (e.g., 204A) car grouping, branded elements are sorted on price within each group irrespective of the associated brand. In the example display matrix, display elements are organized in each row by price from left (lowest price) to right (highest price). The organization generated in the display matrix (e.g., by the matrix engine) presents an easily appreciated display of offers even within the plurality of branded suppliers. Further, in some embodiments, non-branded offers can be positioned in the matrix having a consistent position (e.g., always appearing in the first position 206A in each row) to facilitate consumer interaction with both classes of commodity offers.

For example, in addition to the organization of the branded elements, the white list elements of the display can likewise be sorted on pricing information with the branded elements. In a typical display, the white list pricing occupies the first position in any matrix, as the white list prices are typically discounted for each provider. In some further embodiments, the white list or non-branded display elements are presented first in each row, and then branded display elements can be presented. The white list pricing enables providers to move distressed inventory without sacrificing their normal pricing options. Such distressed inventory can include, for example, over-allocated inventory, under-performing inventory, and/or inventory the supplier wants to move.

According to one embodiment, only one white list element is permitted per offer/commodity grouping. In one example, limiting white list offer display elements within each of group of the matrix display provides incentives for delivering offers to the matrix system with the best terms. Providers can ultimately compete to obtain the white list position within the display matrix. In some embodiments, the criteria for determining the leading white list position can be automatically evaluated by a matrix engine from a data source (e.g., 102). In other embodiments, commodity providers (e.g., car rental providers) can submit bids for establishing the best white list offer for a group in a display matrix. In one implementation, a matrix system and/or matrix engine can be pre-configured with criteria on which to evaluate such offers, for example, the criteria can favor the best price, the best terms, and/or additionally, as the matrix system can be implemented by a commodity referrer, the offers can be evaluated on the best commission for completed sales to determine a white list leader. Additionally, the system can be configured to evaluate any combination of offer criteria. In some implementations, white list offers can be negotiated directly with commodity providers.

In some other settings, the matrix system and/or matrix engine can be configured to host a web interface for submitting bids for a white list position. The matrix engine can display current leading criteria, for example, commission terms, best price, length of deal, etc., for any category available for the commodity being delivered. In some examples, there is a bid display for each grouping of commodities being provided. Each grouping can be displayed in a user interface that permits providers to submit offer terms. The matrix system can evaluate submitted terms to automatically identify a leading white list offer. As discussed, the leading white list offer can be incorporated into a matrix display presented to consumers, where the white list display occupies the first position of every grouping of the selected commodity.

In some embodiments, the matrix display is generated to display a white list element in the first row of the display, and then sort the remaining groups of branded display elements by price. The resulting matrix display (e.g., 202) provides the user or consumer with consistent views of each offer in an easily appreciated format that can incorporate white list and branded offers. In other embodiments, the first position in each row can be reserved for best in class pricing and/or terms, whether the best in class pricing is for a white list or branded offer.

Shown in FIG. 13 is an example user interface 1300 displaying another embodiment of a display matrix 1301, which can be generated by a matrix system (e.g., 100, FIG. 1). User interface 1300 includes a plurality of display elements, organized into commodity groups by row (e.g., at 1302-1308: economy, compact, midsize, standard, with additional groupings being visualized in subsequent display or by scrolling down in the user interface 1300). According to some embodiments, each row in the display is built by the matrix system with the display elements that are identified for each group. In row 1302, display elements 1350-1364 have all been generated by the matrix system, for example, from data included in a commodity data feed. In some embodiments, the matrix system can be configured to identify commodity groups within the received data into display rows 1302-1308. In other embodiments, the matrix system can capture commodity groupings designated as part of the delivered commodity data. In some further embodiments, a matrix system can be organized based on pre-configured groups, and the matrix system can display received data within the pre-configured commodity groups.

The matrix system can be further configured to organize commodity offers, and select specific data from the offers to generate display elements (e.g., responsive to user query terms). In some implementations, the display elements can be generated based on an offer type, for example, branded versus non-branded or white list types of offers. Commodity offer can also include a pricing type for any offer. In the context of rental cars, this can include lower pricing term for a user willing to pay now, and different payment terms for user who wishes to pay later.

In another example, the matrix system can be configured to capture commodity offers and extract groupings from publicly available data on commodity offers. In yet another example, bidding components can also provide offer information used to generate display elements in a matrix display (e.g., 1300).

According to one embodiment, display row 1302 organizes a plurality of display elements each associated with a commodity offer for the economy group. The matrix display can be assembled by row one element at a time, thus, if there are not enough elements to fill a display row, those positions remain empty (e.g., row 1306 positions 1360-1364). If additional commodity offers are received, for example, from a commodity data feed, additional display elements can be generated and incorporated into the matrix display. Each row of display elements can be re-sorted based on price upon introduction of new display elements/offers. Shown at row 1302 position 1350 is an example non-branded display element. At 1320 is a title position, indicating a brand for a branded display element or a white list title for non-branded display elements (e.g., "Best Deal" at 1320). At 1322 a price is listed for the commodity offer associated with the display element. As discussed herein, non-branded display elements convey commodity offers without an associated brand or provider. Such displays enable commodity providers to move unwanted or distressed inventory without sacrificing brand positions, and/or compromising brand loyalty. Upon confirming a reservation for a white list offer, the actual provider will be display in response to confirming and/or purchased the associated commodity.

At 1324, a commodity title can be displayed, e.g., a car name. At 1326, an action element is displayed for booking (e.g., purchasing or renting) the commodity associated with the offer. At 1328 is a second action element included in the display element. The second action element is configured to display additional information about commodity and/or commodity offer. As shown in FIG. 13, each of the plurality of display elements is rendered in a non-expanded view having a same size, height, and width, as the other display elements in the matrix display. However, in response to selection of the second action element (e.g., 1328) the selected display element can be re-rendered, for example, by the matrix system to an expanded view.

Figure 14:
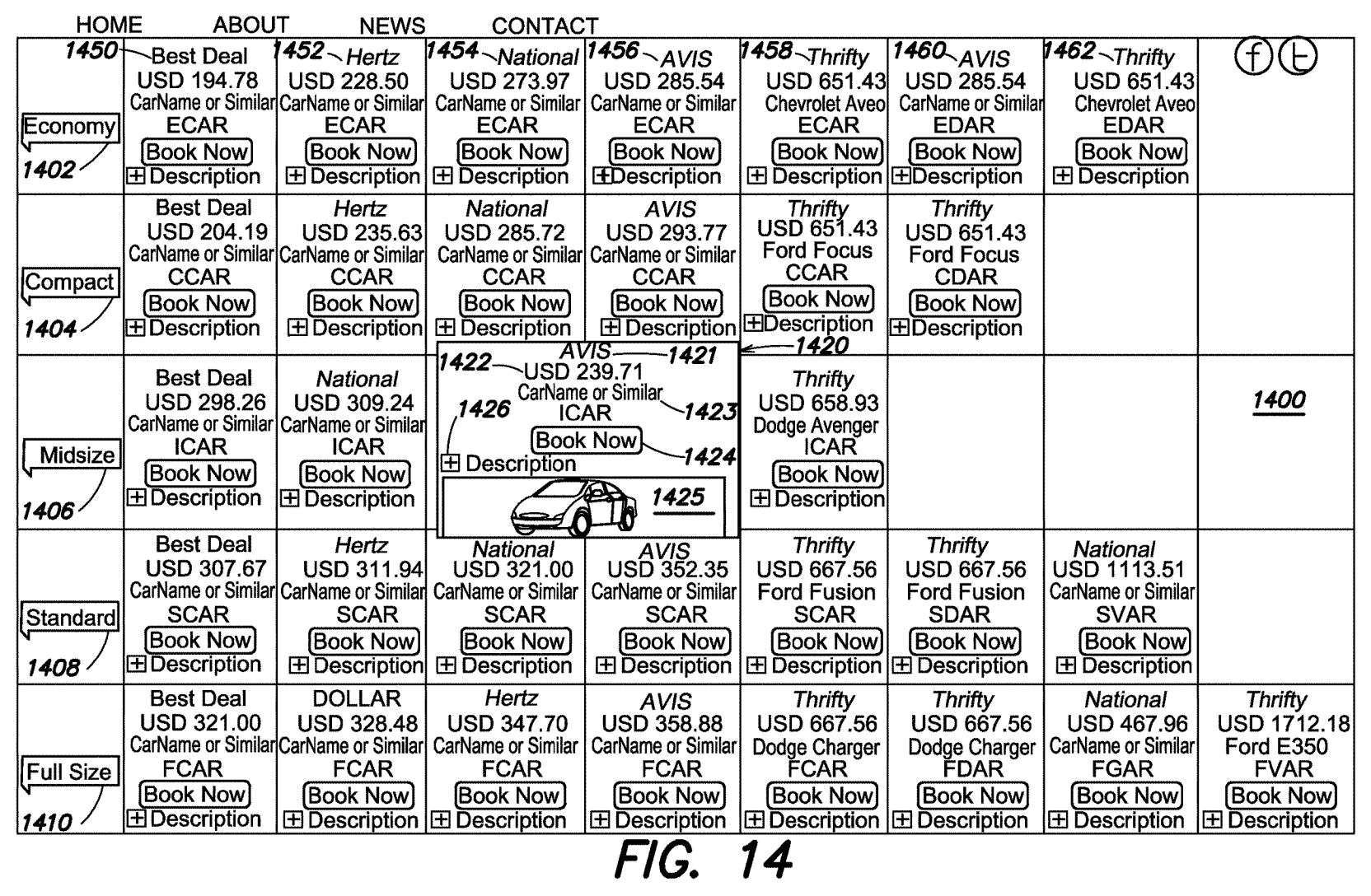

FIG. 14 illustrates an example embodiment of a display matrix 1400 and an expanded display element at 1420. The matrix display can be organized based on rows 1402-1410 and positions 1450-1462. In this embodiment, display element 1420 is shown in an expanded view, responsive to selection of an action element for additional description. The matrix display is re-rendered as shown in 1400 to accommodate any additional information being shown. In one example, row 1406 is re-rendered, for example, by a matrix system to match the expanded height of display element 1420. In this displayed embodiment, only the row including the selected display element is re-rendered. In some examples, the expanded view of display element 1420 can include the information displayed in the non-expanded view (e.g., brand 1421, price 1422, car name 1423, action element 1424) and can include any additional information (e.g., image of the commodity 1425). In some examples, the additional information displayed (e.g., at 1425) can be an image of the actual commodity associated with the offer. The operation of the second action element 1426 can be reconfigured in the expanded view, to cause the matrix system to re-render the display element 1420 in its non-expanded view. In some embodiments, the controls displayed in the non-expanded view can change into new controls displayed in an expanded view, having similar functionality and/or new functionality. In other embodiments, the same controls can be displayed between views with changes in the display of the controls indicating a change in the function provided.

Figure 3A:
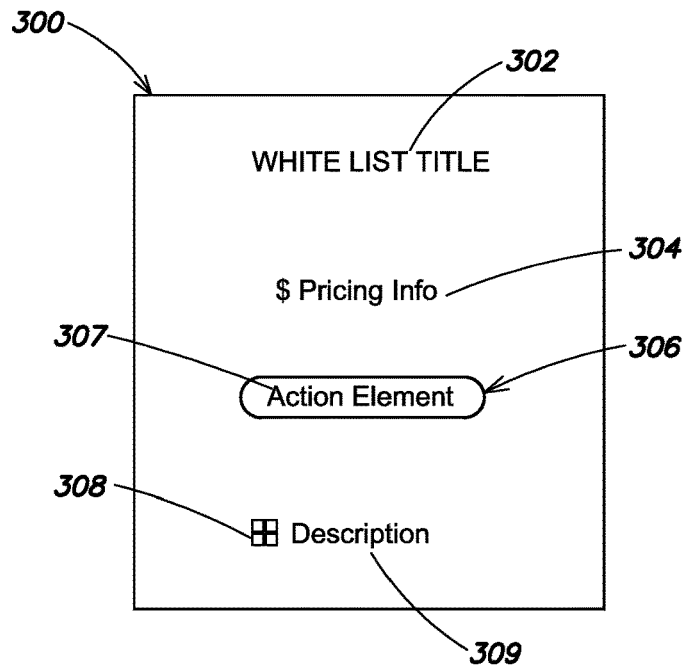
FIG. 3A is a block diagram of an example user interface element, according to one embodiment.
Figure 3B:
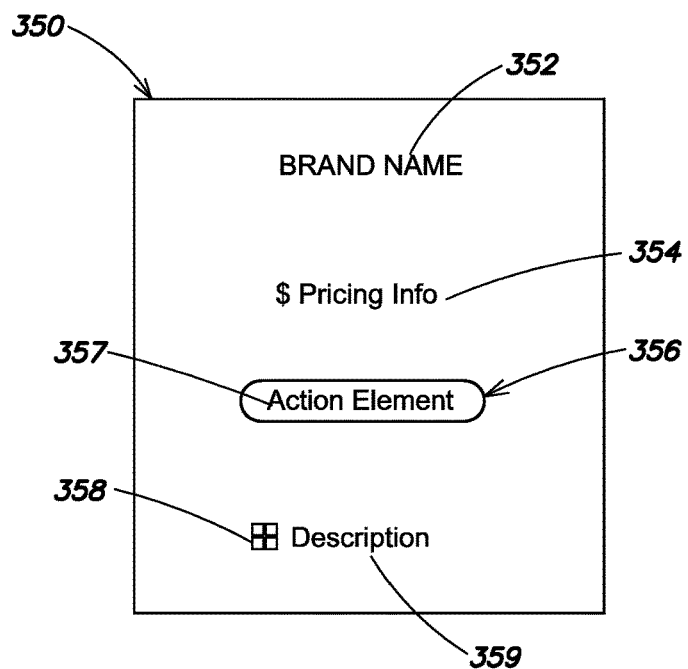
FIG. 3B is a block diagram of an example user interface element, according to one embodiment.

Shown in FIG. 3A-B are example user interface elements 300 and 350 used to build a matrix display rendered in a user interface. Branded and white list display elements are configured to have a consistent appearance when displayed in a user interface relative to each other. A title position is established for each type of display element at 302 for white list display element 300 and at 352 for branded display element 350. The title position presents information to the consumer on the type of offer; for white list display elements, the title position 302 includes a description that indicates the offer being displayed is not branded; and for branded offers, the title position indicates the brand name of the commodity supplier. In some implementations, the display elements are configured to display the same information in the same position. For example, the white list display element 300 includes pricing information at 304, and the branded display element displays pricing information at 354, so that a similar relative position for the displayed information is maintained between the display elements in a display matrix.

At 306 and 356 respectively, an action element is incorporated into the white list 300 and branded 350 display elements. In some embodiments, the positioning of the action elements, by the system, within the display elements is configured to maintain consistent appearance of the display elements within the display matrix. The action element can be configured to be responsive to selection within a user interface. In some examples, the system is configured to generate each display element with selectable features that are responsive to, for example, user selection in a user interface display. The action elements (e.g., 306 and 356) can be associated with a number of actions. In one example, a commodity referrer may implement a matrix system in association with car rentals. The action item associated with each display element can be configured to provide a consumer to book a selected rental option. In response to selection of the action element (e.g., 306 and 356), the system can transition the user interface to a booking window to complete a rental. The booking window can include positions for accepting payment information, specification of additional detail regarding the rental (e.g., pick up location, pick up time, drop off location, drop off time, etc.). Each action element can also include a position for a title of the action (e.g., at 307 and 357) the action element is configured to perform.

Referring to FIG. 2, a branded display element example includes a title "book now" for the action element at 208 and a white list display element example include the same title "book now" for the action element at 210. At 308 and 358 a second action element appears in each respective display element. In some embodiments, each display element in an initial view of the display matrix can be configured to display a minimal amount of information to avoid overwhelming end-users with too much information. This can be helpful where large inventories and correspondingly large numbers of commodity offers are presented in a user interface. The second action element is configured to provide access to additional information upon selection in a user interface. In some implementations, the action element for additional information can be implemented in all the white list and branded display elements shown in the matrix. The second action element can also include a title for describing the associated action "Description" at 309 and 359.

In some embodiments, the system is configured to execute differently in response to selection of the description action element within the display elements. In particular, rather than transitioning to a new window or page, for example, in a browser program, the system and/or a matrix engine can be configured to re-render the display element with additional detail regarding the offer.

Figure 4:
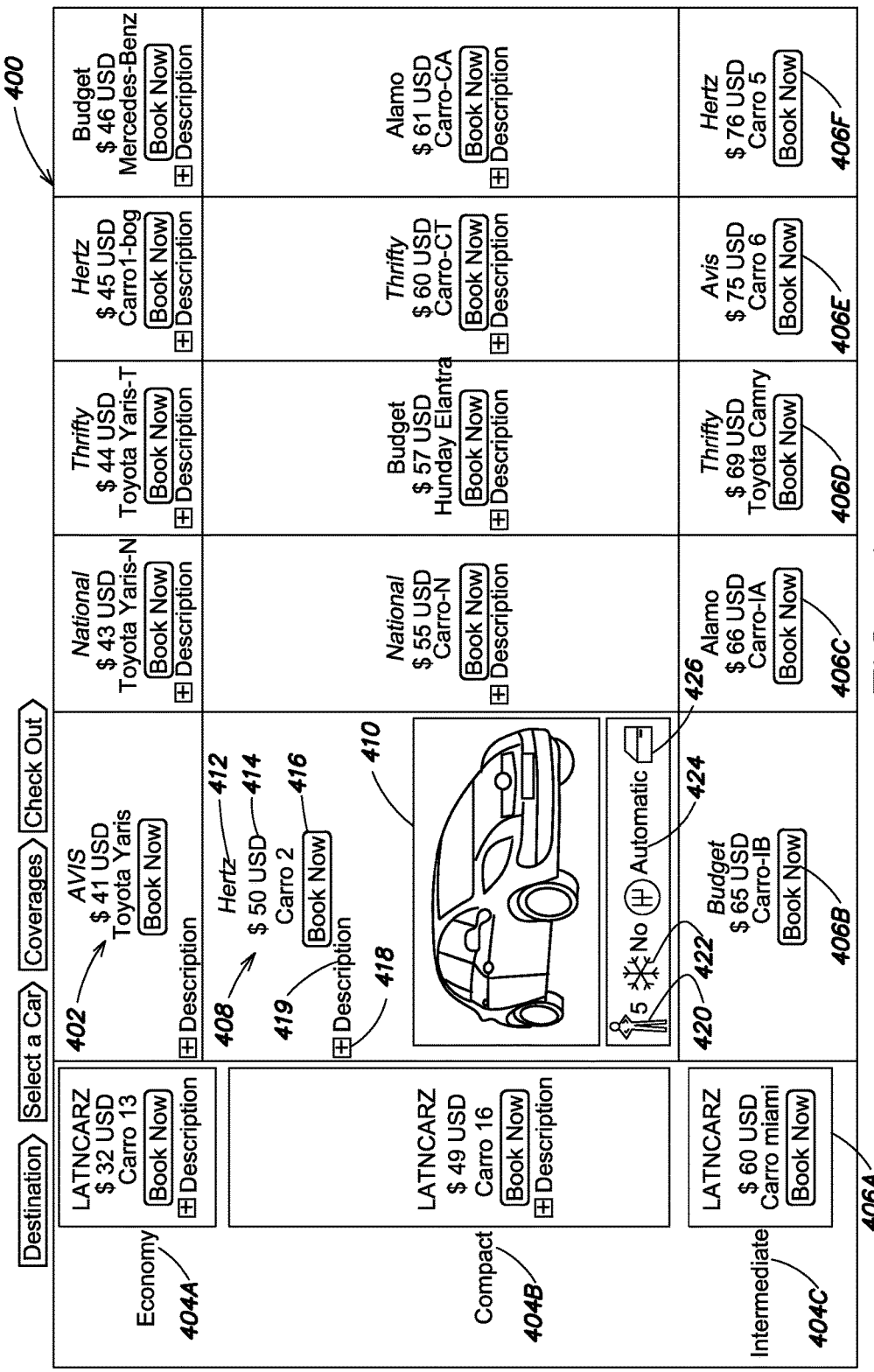
FIG. 4 is an example user interface, according to one embodiment.

Shown in FIG. 4 is an example user interface 400 including a matrix display. The matrix display 400 is organized as grid 402. The rows of the grid represent grouping of rental cars available for user selection. An economy group is displayed at row 404A, a compact group at row 404B, and an intermediate group at row 404C. Within each row the available cars are listed in order of lowest price from left to right. Position 406A includes the white list display elements associated with white list offers for car rentals. Positions 406B-G include price sorted by group branded display elements.

Shown in interface 400 is an expanded view of the display matrix. Responsive to selection of a description action item in a non-expanded view, the matrix system and/or a matrix engine can re-render the display matrix to incorporate additional detail within the selection display element. Shown at 408, in an example display element that has been re-render in an expanded format to incorporate an image 410 of the commodity associated with an offer. The expanded view of the branded display element 408, can include the information and elements from the non-expanded view brand title 412, price, 414, and action element 416 ("book now"). In some embodiments, the display of the description action element can change to reflect a new action for the element, at 418, the action element titled "description" at 419 is configured to eliminate the additional detail shown in display element 408. Responsive to selection, the system can be configured to re-render the expanded display element in a non-expanded view. In addition to an image of the commodity associated with the offer (in this example an image of the car to be rented), additional detail information can be provided on the commodity. The additional information on the vehicle can include the rate number of passengers at 420, availability of a/c at 422, transmission for the vehicle at 424, and optionally number of doors at 426.

As is shown in FIG. 4, the system can be configured to adjust the sizing of rows and positions within the display matrix to accommodate the expanded view a selected display element. Comparing the example display matrix of FIG. 2, to the example display matrix of FIG. 4, the expanded view of the display matrix includes a re-rendering of the size of all of the display elements in the same row (e.g., 404B) and same position (e.g., 406B) as the expanded display element 408.

Figure 5:
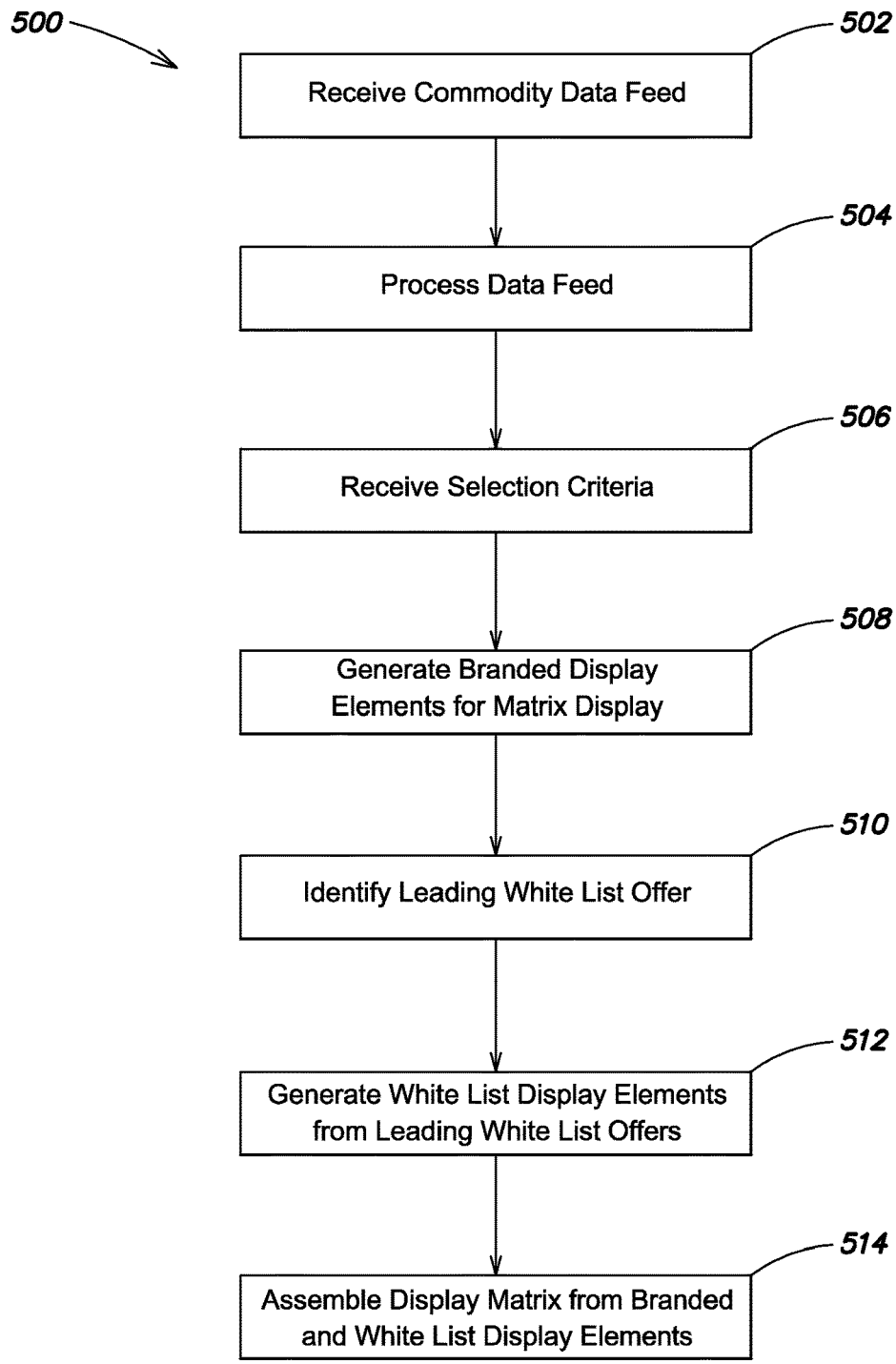
FIG. 5 illustrates an example process flow for generating a matrix display, according to one embodiment.

FIG. 5 illustrates an example process flow 500 for generating a matrix display of commodity offers. Process 500 begins with receipt of commodity data at 502. In some embodiments, a matrix system and/or matrix engine can execute process 500 to generate the matrix display. The matrix system and/or matrix engine can be connected to a commodity data feed provider. In some examples, the operator of the matrix system can subscribe to receive commodity feed data. In other examples, the matrix system can be configured to capture commodity data from available resources. In one example, the matrix system can implement web crawlers and/or robots to capture pricing information associate with a selected commodity. The resulting display matrix can be configured to reflect the pricing and providers of the selected commodity. Various commodity industries include service providers, who provide data on the commodities within the industry as a service. The matrix system can be connected to such providers and also can be configured to capture information separately. Separately captured information can be used to augment and/or verify data feed information.

At 504, the data feed is processed and information associated with specific offers can be stored. The data feed data can first be sorted prior to storage. The data can be stored in any format and based on any organization. In one example, a data feed service provides information on auto rentals. The data feed for available rental offers can be processed and stored in the matrix system based on provider, location, commission rates, etc.

Typically the commodity data is provided to an end-user or a consumer for selection in a user interface. For example, the consumer can connect to a matrix system to obtain a specific commodity. Process 500 continues at 506, wherein selection criteria for a commodity are received. As discussed, a consumer can input their selection criteria into a web-site and the matrix system can be configured to retrieve responsive data based on the selection criteria. In the auto rental setting, the criteria can include, for example, any one or more of rental location, return location, pick up date, pick up time, drop off date, drop off time, pricing information, car only selections (i.e., excluding insurance), car and coverage (including insurance), unlimited mileage options, etc.

Process 500 continues at 508, where branded display elements are generated based on results obtained from the received selection criteria. The branded display elements can be generated from the data processed at 502. Additionally, the branded display elements can be generated from raw feed data as well at 508. In some embodiments, the branded display elements are generated based on a minimal set of data elements from an offer on a commodity. Using the auto rental industry again as an example, the branded display elements can be generated based on a brand or provider, price, and at least one action element for completing a purchase of the commodity (see e.g., 208 "Book Now" FIG. 2). Additional action elements can be provided in the generated branded display element. In one example, the additional action element upon selection, causes the display of additional information associated with the commodity offer.

In addition to branded display elements, non-branded display elements can be generated to form a display matrix. At 510, leading white list offers are identified, and used to generate white list display elements or non-branded display elements at 512. Similar to branded display elements, in some embodiments, the white list or non-branded display elements are generated based on a minimal set of data from an offer on a commodity. Using the auto rental industry again as an example, the white list display elements can be generated to include a white list identifier, price, and at least one action element for completing a purchase of the commodity (see e.g., position 206A and 210 "Book Now" of FIG. 2). Additional action elements can be provided in the generated white list display element. In one example, the additional action element upon selection, is configured to cause the display of additional information associated with the commodity offer.

In some embodiments, identification of leading white list offers can be made from data processed from the data feed at 502. As discussed, white list offers include commodity offers that are not displayed with an associated brand or provider. Commodity providers can be willing to offer heavy discounts on their inventory, but must take care to ensure that their own discounted offers do not impact related sales. By offering white list pricing, the provider remains anonymous until an actual purchase is completed. Each white list display element is configured to prevent dissemination of the provider of the commodity associated with the particular white list offer. In some examples, leading white list offers can be identified strictly on best price. In other examples, different criteria can be employed to identify the best or leading white list offer. For example, best terms can be used to determine a leading white list offer.

In some embodiments, the matrix system is implemented by commodity re-sellers who deliver information on best price for existing suppliers. Best term evaluations can include best commission offers for the re-seller to identify a white list leader. Best terms can also be used in conjunction with pricing terms to identify a leading white list offer. Additional criteria can be employed to identify leading white list offers.

White list display elements are generated from leading white list offers at 512. In some embodiments, multiple white list display elements are generated, however, only one white list display element is permitted per grouping of a selected commodity. Returning to the auto rental example, rental cars can be grouped into classes: economy, compact, intermediate, standard, full-size, truck/suv, and jeep for example. Each group can have an associated white list offer. Depending on the commodity, one or more white list display elements can be generated. For commodity offers, hotel offers can include rating categories, number of rooms, number of beds, number of persons as categories on which to group commodity offers. In other commodity settings, airline travel can be grouped into class (first, business, coach, etc.)

Once leading white list offers have been identified, for example, at 510, the generated white list display elements can be assembled with the branded display elements to form a matrix display at 514. The matrix display can be assembled into a grid of rows and positions within rows. For example, the rows of the matrix display can be associated with any groupings of the commodity offers being displayed (e.g., economy, compact, etc. of rental cars). Each offer within the group or row can be sorted based on price to present an easily understood format to consumers over a plurality of different provider/brands, which can also include non-branded offers. Each row can be built based on price sorted display elements, where the display elements are assembled from left to right in each row based on lowest price. Each row can have a different number of display elements per category based on the current offers available. In some embodiments, the display matrix is assembled by row, first using a white list display element, followed by price sorted branded display element. In other embodiments, the white list and branded display elements are sorted and displayed in order of price. In some examples, if a white list offer does not beat the existing branded offers based on pricing, the associated white list display element may not be displayed in the matrix.

Figure 6:
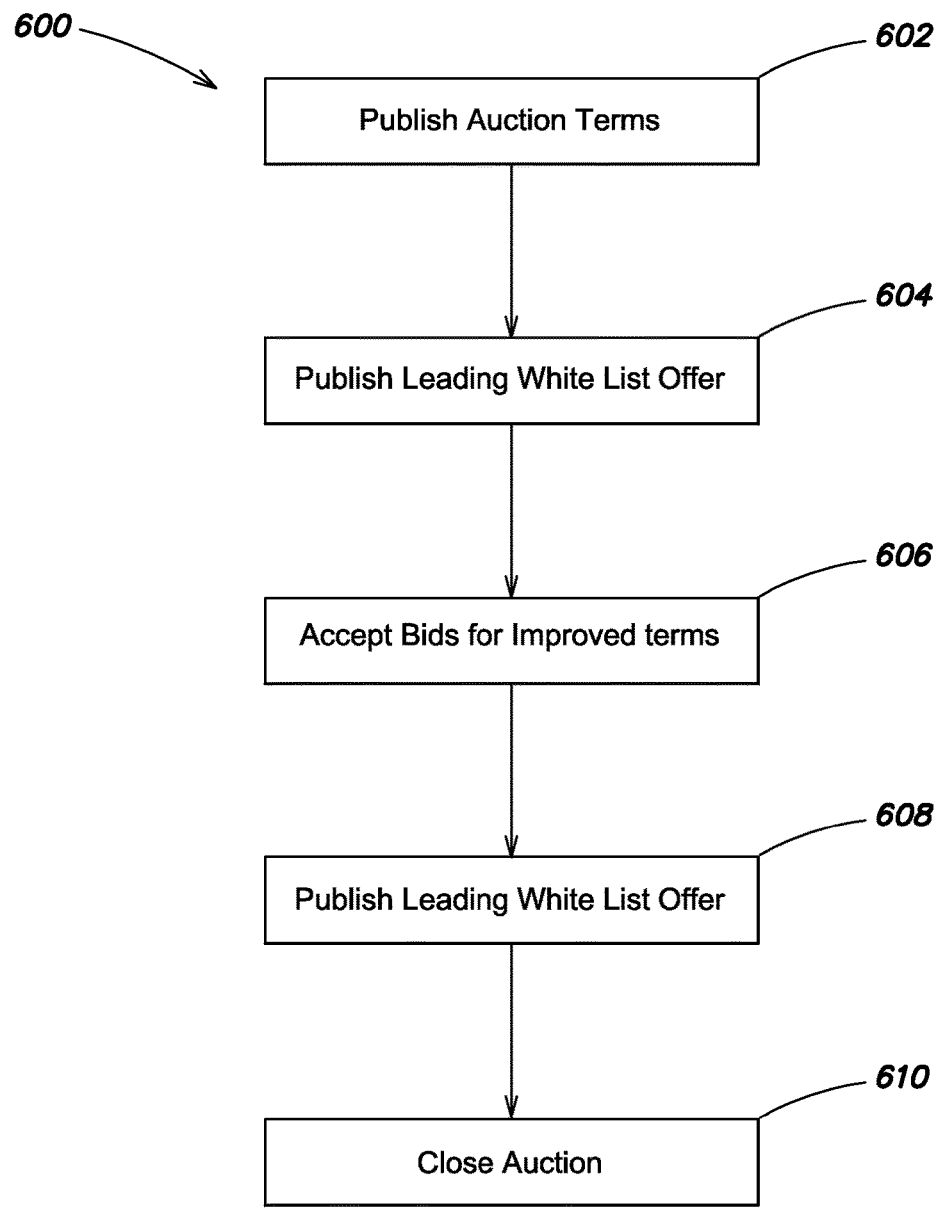
FIG. 6 illustrates an example process for identifying a leading white list offer, according to one embodiment.

One should appreciate the process 500 is shown by way of example, and that the enumerated steps can be performed together or in different order than illustrated. In some further embodiments, identification of leading white list offers (e.g., at 510) can occur via execution of separate processes and/or sub-processes. FIG. 6 illustrates an example process for identifying a leading white list offer. As discussed, leading white list offers can be identified from offers received in the commodity data feed or obtained from other resources. In some further embodiments, leading white list offers can be identified from bidding processes, where suppliers desiring to move inventory can bid or compete for listing in the white list display element. Bidding can take place based on commodity category, with each white list position available to the highest bidder.

Process 600 illustrates an example process flow for identifying a white list leading offer. Process 600 begins with a display to bidding participants of the terms of the auction for the white list position at 602. In some embodiment, suppliers of a selected commodity can log into a web-site hosting an auction for at least one white list position. The auction can identify terms for bidding, how winning bidders are identified, and any requirements for valid bids/bid increments, etc. In some embodiments, the leading white offer and associated terms can be published on the web-site in the user interface at 604. In some examples, the initial leading white list offer can be established from the best price branded offer. Thus all subsequent bids would have to be at least as good as or better than the cheapest branded offer. In other examples, the commodity data feed can include information on white list pricing and an initial leading white list offer can be automatically identified from the commodity feed data.

The published leading white list offers can be organized and/or accessed based on commodity and commodity category. Commodity providers can submit terms that incrementally improve the current leading white list offer at 606. Once an improvement has been submitted to the current leading white list offer and new leading offer can be published at 608. Steps 606 and 608 can be repeated until the close of the auction at 610. Each category for each commodity can include a time period during which the white list offer must be honored. In some embodiments, the provider can specify other limiting criteria for their white list offer, which may include, for example, a maximum number of white list redemptions or sales.

At the close of the auction for the leading white list offer (e.g., 610), the leading white list offer is stored. The stored white list offer can be compiled at that time into a white list display object that can be retrieved by, for example, a matrix engine to assemble or generate a matrix display of commodity offers.

Example Computer Implementations

Various aspects and functions described herein, in accord with aspects of the present invention, may be implemented as hardware, software, or a combination of hardware and software on one or more computer systems. There are many examples of computer systems currently in use. In some embodiments, various functions discussed herein can be implemented as system components which are software executing on the hardware of at least one computer system. Various system components can be executed as part of a matrix engine and/or be called by a matrix engine executing on a computer system. Some example computer systems include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 7:
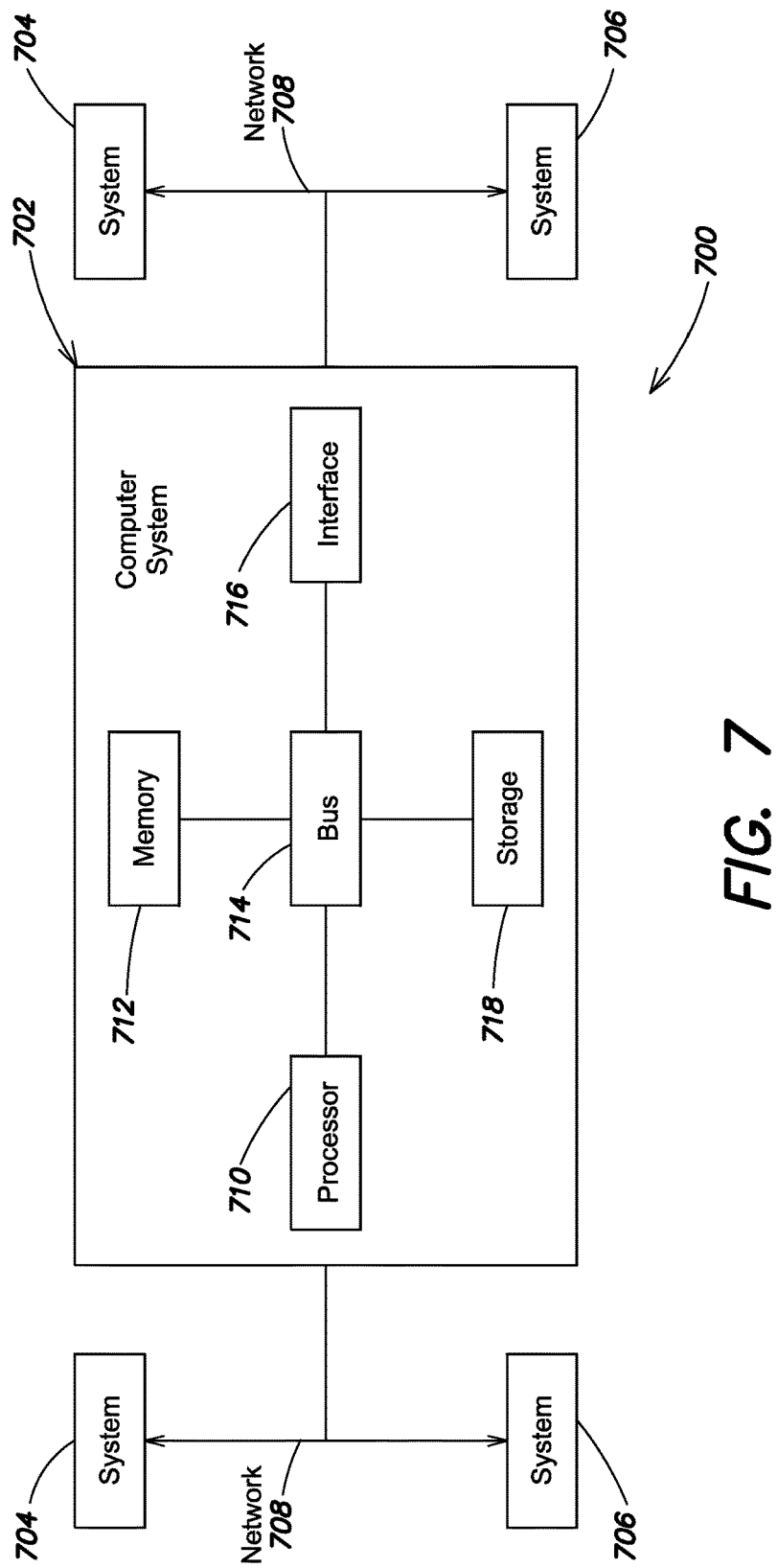
FIG. 7 is a block diagram of one example of a computer system that may be used to perform processes and functions disclosed herein.

FIG. 7 shows a block diagram of a distributed computer system 700, in which various aspects and functions in accord with the present invention may be practiced. The distributed computer system 700 may include one or more computer systems. For example, as illustrated, the distributed computer system 700 includes three computer systems 702, 704 and 706. As shown, the computer systems 702, 704 and 706 are interconnected by, and may exchange data through, a communication network 708. The network 708 may include any communication network through which computer systems may exchange data. To exchange data via the network 708, the computer systems 702, 704, and 706 and the network 708 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA IIOP, RMI, DCOM and Web Services.

Computer systems 702, 704 and 706 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 704 and other computing devices in the network.

To ensure data transfer is secure, the computer systems 702, 704 and 706 may transmit data via the network 708 using a variety of security measures including TSL, SSL or VPN, among other security techniques. While the distributed computer system 700 illustrates three networked computer systems, the distributed computer system 700 may include any number of computer systems, networked using any medium and communication protocol.

Various aspects and functions in accord with the present invention may be implemented as specialized hardware or software executing in one or more computer systems including the computer system 702 shown in FIG. 7. As depicted, the computer system 702 includes a processor 710, a memory 712, a bus 714, an interface 716 and a storage system 718. The processor 710, which may include one or more microprocessors or other types of controllers, can perform a series of instructions that manipulate data. The processor 710 may be a well-known, commercially available processor such as an Intel Pentium, Intel Atom, ARM Processor, Motorola PowerPC, SGI MIPS, Sun UltraS-PARC, or Hewlett-Packard PA-RISC processor, or may be any other type of processor or controller as many other processors and controllers are available. As shown, the processor 710 is connected to other system placements, including a memory 712, by the bus 714.

The memory 712 may be used for storing programs and data during operation of the computer system 702. Thus, the memory 712 may be a relatively high performance, volatile, random access memory such as a dynamic random access memory (DRAM) or static memory (SRAM). However, the memory 712 may include any device for storing data, such as a disk drive or other non-volatile storage device, such as flash memory or phase-change memory (PCM). Various embodiments in accord with the present invention can organize the memory 712 into particularized and, in some cases, unique structures to perform the aspects and functions disclosed herein.

Components of the computer system 702 may be coupled by an interconnection element such as the bus 714. The bus 714 may include one or more physical busses (for example, busses between components that are integrated within a same machine), and may include any communication coupling between system placements including specialized or standard computing bus technologies such as IDE, SCSI, PCI and InfiniBand. Thus, the bus 714 enables communications (for example, data and instructions) to be exchanged between system components of the computer system 702.

Computer system 702 also includes one or more interfaces 716 such as input devices, output devices and combination input/output devices. The interface devices 716 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 716 allow the computer system 702 to exchange information and communicate with external entities, such as users and other systems.

Storage system 718 may include a computer-readable and computer-writeable nonvolatile storage medium in which instructions are stored that define a program to be executed by the processor. The storage system 718 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 710 or some other controller may cause data to be read from the nonvolatile recording medium into another memory, such as the memory 712, that allows for faster access to the information by the processor 710 than does the storage medium included in the storage system 718. The memory may be located in the storage system 718 or in the memory 712. The processor 710 may manipulate the data within the memory 712, and then copy the data to the medium associated with the storage system 718 after processing is completed. A variety of components may manage data movement between the medium and the memory 712, and the invention is not limited thereto.

Further, the invention is not limited to a particular memory system or storage system. Although the computer system 702 is shown by way of example as one type of computer system upon which various aspects and functions in accord with the present invention may be practiced, aspects of the invention are not limited to being implemented on the computer system, shown in FIG. 7. Various aspects and functions in accord with the present invention may be practiced on one or more computers having different architectures or components than that shown in FIG. 7. For instance, the computer system 702 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 702 may include an operating system that manages at least a portion of the hardware placements included in computer system 702. A processor or controller, such as processor 710, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating system available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

Figure 8:
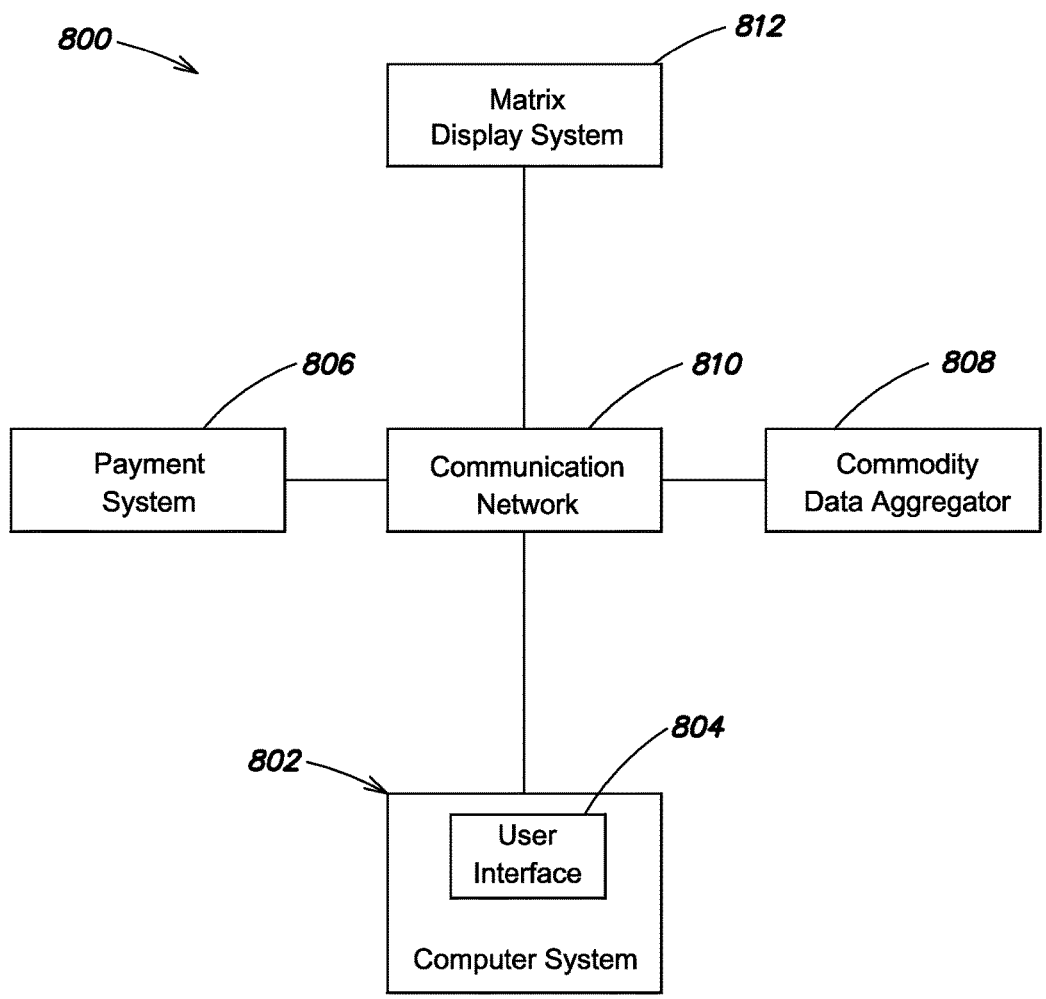
FIG. 8 is a block diagram of an example system architecture for delivering a matrix display of commodity offers, according to one embodiment.

Shown in FIG. 8 is a block diagram of an example system architecture 800 for delivering a matrix display of commodity offers to an end user in a user interface 802 on the user's computer 804. According to some embodiments, the end user can search commodity information by inputting query terms into the user interface 802. In some examples, the user interface can be rendered within a browser or browser window executing on the user's computer 802 (FIG. 9A, illustrates an example search window display 900).

Interface 802 can be connected to a matrix display system 812 through, for example, communication network 810. Communication network 810 can include any network architecture (LAN, WAN, cellular, etc.) and can include, for example, the Internet. The matrix display system can include a matrix engine and/or system components discussed herein for generating and organizing a matrix display of commodity offers. The matrix display system is configured to accept query terms from the user interface and identify matching commodity offers. The system can be further configured to organize the responsive offers into a display matrix, which is communicated to the user's computer system 804 for display as a screen in the user interface 802.

As discussed above, the display matrix system 812 can be communicate with a commodity data aggregator 808. The commodity data aggregator 808 accumulates existing information from a plurality of commodity providers, and supplies the available commodity offers as a data feed to system 812. In the auto-rental industry, various data feed providers exist. The data feed providers capture all rental offers, sometimes including unpublished offers to deliver a comprehensive data feed of available car inventories, including, for example, price, terms, location, etc. Other data providers exist in other industries, including hotel rental, airfare sales, etc. In some embodiments, the matrix display system 812 can be configured to accept commodity information on any industry. In other embodiments, the matrix display system can be configured to capture available commodity data through automated data retrieval using, for example, communication network 810.

The matrix display system 812 organizes commodity information into a matrix display as discussed above. Further the matrix display system allows the end user to select a particular commodity in the matrix display for purchase, rental, etc. In the car rental industry, for example, the matrix system is also configured to communicate with a payment system 806 for processing commodity orders. The matrix display system and the payment system 806 can be configured to process commodity orders in association with commission identifiers. In some embodiments, the matrix display system can be implemented as a re-seller site. The re-seller site can be configured to offer the commodities of other providers. In return, the commodity providers pay a commission to any re-seller who executes a sale, rental, etc. associated with their inventory.

Figure 11:
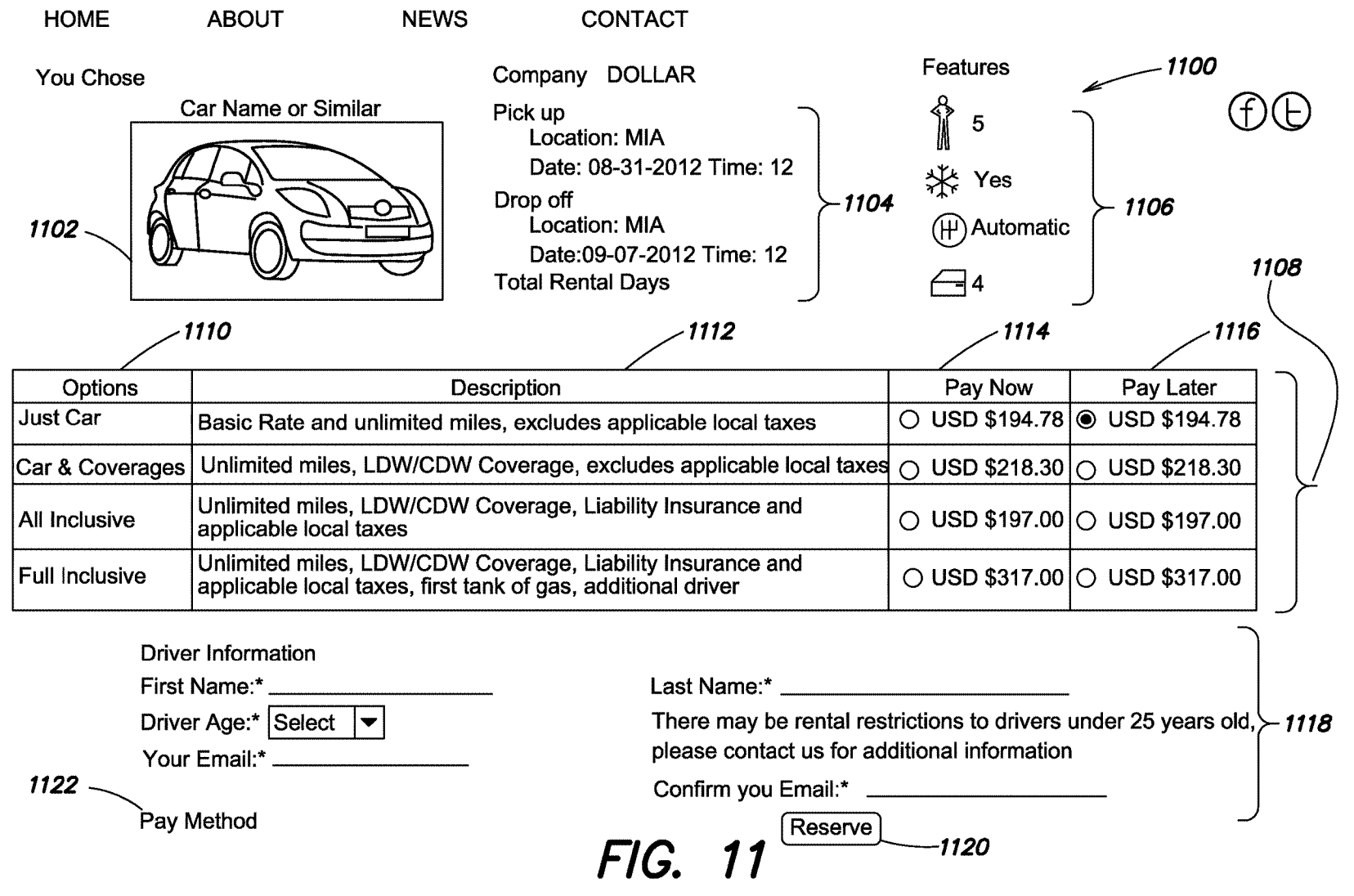

In some embodiments, the matrix display system can be configured to accept payment information in a payment screen (FIG. 11 illustrates an example payment screen 1100). The matrix display system 812 can provide the payment information to a payment system 806 to complete the sale. In some embodiments, the matrix display system is configured to provide detail associated with a white list offer (e.g., displayed as a non-branded or white list display element) only in response to accepting payment information associated with that offer. For example, once the payment information has been processed, the matrix display system can present the details associated with the commodity (including for example, provider, location, commodity specifics, etc.).

In some implementations, the matrix display system can be configured to further simplify the payment process. In particular, car rental services require a driver to be insured. Oftentimes this issue is first presented to a driver at the time of vehicle pick-up. This can be a time of great stress. By providing such information and rates as part of the initial commodity purchase (e.g., FIG. 9A at 902, 904, and 906) the display matrix can simplify a commodity purchase. At 908, each purchase option is explained, responsive to selection of 902, 904, and 906. Shown in FIG. 9B is the user interface 900 as rendered in response to selection of 904 car & coverage. At 908, a description of the car & coverage option is displayed. Shown in FIG. 9C is the user interface 900 as rendered in response to selection of 906 inclusive. At 908, a description of the inclusive option is displayed.

In some embodiments, user interface 900 is the first screen rendered by a matrix system. An end-user looking to purchase and/or rent a commodity can access user interface 900 to input their desired search criteria. For example, the user can select 902, 904, and 906 depending on their preference for a rate type. Additional options can be presented in the user interface, including, for example, payment options. In one embodiment, payment options (e.g., pay now and pay later) can be displayed as selectable options in the user interface. The selection option then can be used as search criteria along with any other specified information.

Shown in FIG. 10 is another example user interface 1000. User interface 1500 is similar to interface 900. However, user interface 1000 includes a different type of inclusive offers for selection. At 1002, the inclusive option presented includes: liability insurance, CDW/LDW protection (collision damage waiver (CDW) or loss damage waiver (LDW)), additional driver, unlimited mileage*, and mandatory taxes and fees at 1004. According to some embodiments, the purchase options display can be determined from the commodity data feed and the available offers contained therein. Other embodiments can include different terms for each displayed category.

In some further embodiments, the matrix display system can organize and display both non-branded and branded display elements associated with a variety of commodities. The offers contained in the branded and non-branded displays can include purchases, rentals, service terms, etc. Various embodiments of matrix display systems can be implemented in a variety of industries, and a variety of settings, including, for example, airfare sales, room rental, cottage rental, home rental, service offers, electronics, etc.

Shown in FIG. 11 is an embodiment of a user interface 1100 for reserving a commodity purchase/rental, which in some embodiments can include a section for inputting information associated with a payment method (e.g., 1122). User interface 1100 includes description of the commodity being purchased at 1102-1106. The description can include, for example, an image of the commodity at 1102. Any details associated with the commodity offer being committed to can be displayed at 1104 (e.g., for vehicle rentals, pickup location, pickup times, drop off location, drop off time, total rental days, etc.). In some examples, the user interface can include additional details for the commodity at 1106 (including, for example, number of passengers for a vehicle rental, a/c, automatic transmission, number of doors, etc.).

Purchase information can be displayed at 1108. In some examples, specific purchase options can be displayed for each commodity. For vehicle rentals, "just car," "car & coverage," "all inclusive," and "full inclusive" options can be displayed at 1110. Associated descriptions for each purchase option can be displayed at 1112. In some settings, commodity offers can include discounts for committing to a purchase and/or rental immediately (e.g., as shown at 1114) rather than delaying purchase until later (e.g., at 1116). According to the commodity being offered, further information can be required. In the vehicle rental industry, driver information can be required to book the vehicle rental. First name, last name, driver age, e-mail address, drivers license number, etc. can be collected at 1118. In some embodiments, once required information is input a reservation element displayed at 1120 can be activated. Once the element is active, selection in the user interface can result in a matrix system to communicate payment information, for example, to a payment system, and/or communicate a reservation for the commodity. In some implementations, a matrix system can deliver commodity offers compiled from commodity providers.

Responsive to selection of 1120 in the user interface 1100, the matrix system can communicate a reservation to the commodity providers. In the auto rental industry, such reservations can be accompanied by re-seller identifiers associated with an operator of the matrix system. Based on completed purchases/rentals, the matrix system operation can be compensated with a commission. In some embodiments, the commission can be communicated to the matrix system operator as part of a commodity data feed. Commodity offers included in the data feed can include commission rates, as well as further details regarding the commodity, price, and for rentals, timing, location, etc.

Shown in FIG. 12 is another example user interface 1200 displayed by a matrix system responsive to selection by a user to book and/or purchase a particular commodity. User interface 1200 is configured to display auto rental commodities and associated offers for their rental. In particular, details for a selected rental can be displayed at 1202 and various options for specifying the terms of the rental can be selected in the user interface at 1204.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

In addition, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A user interface displayed on a computer system, wherein the user interface is rendered on a display of the computer system in response to execution of instructions on at least one processor of the computer system, the user interface comprising:
   a plurality of branded display elements;
   at least one non-branded display element, the at least one non-branded display element comprising an offer of a commodity from an unidentified source, wherein each of the branded and non-branded display elements include a first and second action element responsive to selection in the user interface, wherein the first action element is configured to automatically transition the computer system to a commodity purchase screen responsive to selection in the user interface, and wherein the second action element is configured to automatically transition a respective display element from a non-expanded view of the respective display element to an expanded view of the respective display element on a first selection of the second action element by re-rendering the respective display element with at least one piece of additional information regarding the commodity, the at least one piece of additional information including at least one of a rate, number of passengers, transmission type, and number of doors, and wherein the second action element is configured to automatically transition the respective display element from the expanded view of the respective display element to the non-expanded view of the respective display element on a second selection of the second action element by re-rendering the respective display element without the at least one piece of additional information regarding the commodity; and
   a matrix display for displaying the plurality of branded and the at least one non branded display element, wherein the matrix display is further configured to organize the plurality of branded and the at least one non branded display element into a plurality of commodity groups, wherein each commodity group is displayed as a row within the matrix display with positions of at least one branded display element and at least one non-branded display element sorted on price.

2. The user interface according to claim 1, wherein the matrix display is further configured to include up to one non-branded display element in each of the plurality of commodity groups.

3. The user interface according to claim 1, wherein the matrix display organizes the at least one non-branded display element and the plurality of branded display elements into rows of the matrix display for each one of the plurality of commodity groups.

4. The user interface according to claim 1, wherein selection of the second action element in any of the display elements of the matrix display reconfigures the display elements appearing in the associated row and associated position of display elements to a size corresponding to the expanded view of the respective display element in which the second action element is selected.

5. The user interface according to claim 1, further comprising a bid component configured to accept bid information from user input in the user interface to establish a leading non-branded offer.

6. The user interface according to claim 1, further comprising a display component, wherein the display component is further configured to organizing the display elements into a plurality of commodity groups.

7. The user interface according to claim 6, wherein the display component is further configured to display the display elements in rows based on the plurality of commodity groups.

8. The user interface according to claim 6, wherein the display component is further configured to sort the plurality of display elements within each of the plurality of commodity groups based on associated pricing information.

9. The user interface according to claim 5, wherein the bid component is further configured to analyze the received bids to establish the leading non-branded offer.

10. The user interface according to claim 9, wherein the bid component is further configured to determine a received bid includes better terms than an existing leading non-branded offer.

11. The user interface according to claim 1, wherein each of the branded and non-branded display elements include a description action element, wherein the description action element is further configured to re-render the display element with additional detail regarding the offer.

12. The user interface according to claim 1, wherein the user interface is configured to display a bidding view for receiving bids to establish a leading non-branded offer.

13. The user interface according to claim 12, wherein the user interface is coupled to an analysis component configured to automatically analyze received bids to establish the leading non-branded offer.

14. The user interface according to claim 13, wherein the user interface is configured to selectively display the at least one non-branded display element, responsive to determining the leading non-branded offer by the analysis component, and associate the leading non-branded offer with the at least one non-branded display element.

15. The user interface according to claim 12, wherein the user interface is further configured to accept bids for each commodity group associated with the matrix display, wherein the bidding view includes a view of current leading terms associated with each leading offer in each commodity group.

16. The user interface according to claim 12, wherein the user interface is further configured to require each bid include an improvement of at least one term compared to a current leading non-branded offer.

17. The user according to claim 16, wherein the user interface is coupled to a bid component configured to automatically analyze received bids to determine whether the bid includes at least one term as compared to the current leading non-branded offer.

* * * * *